United States Patent [19]

Sawluk

[11] Patent Number: 5,408,983
[45] Date of Patent: Apr. 25, 1995

[54] SAW

[75] Inventor: Wlodzimierz Sawluk, Hamburg, Germany

[73] Assignee: Ernst Winter & Sohn (GmbH & Co.), Hamburg, Germany

[21] Appl. No.: 75,811

[22] Filed: Jun. 11, 1993

Related U.S. Application Data

[63] Continuation of Ser. No. 400,467, Aug. 28, 1989.

[30] Foreign Application Priority Data

Aug. 27, 1988 [DE] Germany .................. 38 029 160.6

[51] Int. Cl.⁶ .............................................. B28D 1/04
[52] U.S. Cl. .................................. 125/15; 451/546
[58] Field of Search ..................... 125/15, 13.01; 51/206 R, 206.4, 206 NF, 206.5, 207

[56] References Cited

U.S. PATENT DOCUMENTS

| | | | |
|---|---|---|---|
| 237,472 | 2/1881 | Blackburn | 51/207 |
| 2,475,517 | 7/1949 | Ries et al. | 51/206 NF |
| 3,619,152 | 11/1971 | Yalof et al. | 125/15 |
| 4,069,622 | 1/1978 | Swarovski | 51/206 NF |
| 4,989,375 | 2/1991 | Henmi | 51/206 NF |
| 5,115,796 | 5/1992 | Schweickhardt | 51/206.4 |

Primary Examiner—Robert A. Rose
Attorney, Agent, or Firm—Michael J. Striker

[57] ABSTRACT

A saw comprises a saw blade having an outer edge, and a diamond-containing coating carried on the outer edge of the saw blade, the saw blade being composed of a synthetic plastic reinforced with a fiber material composed of a plurality of fibers with a volume fraction of 30–70%.

11 Claims, 3 Drawing Sheets

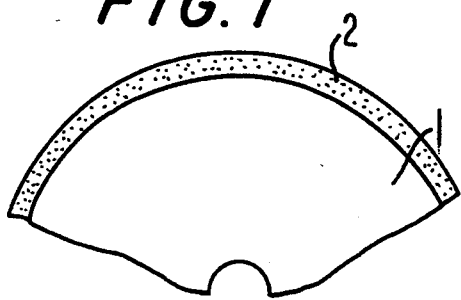
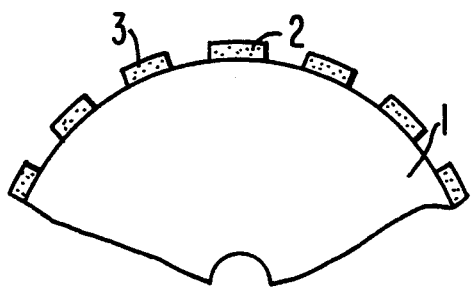
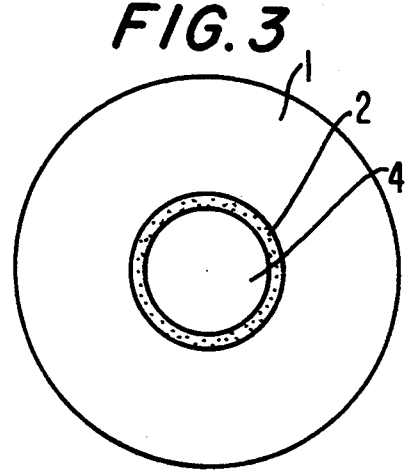
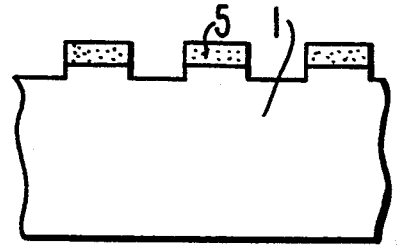
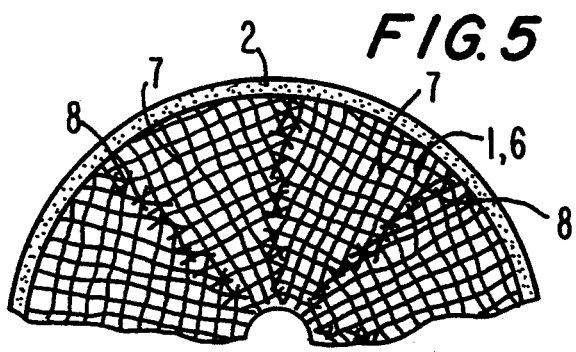
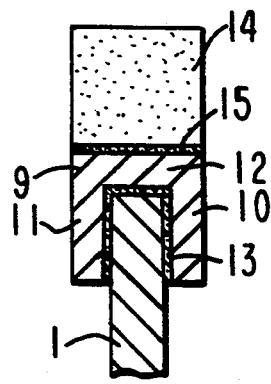

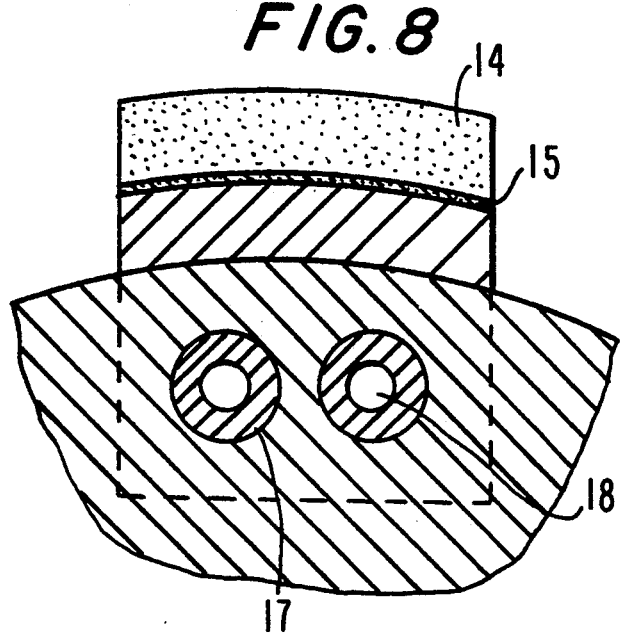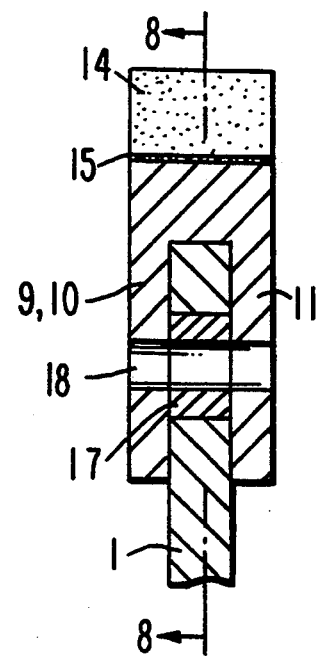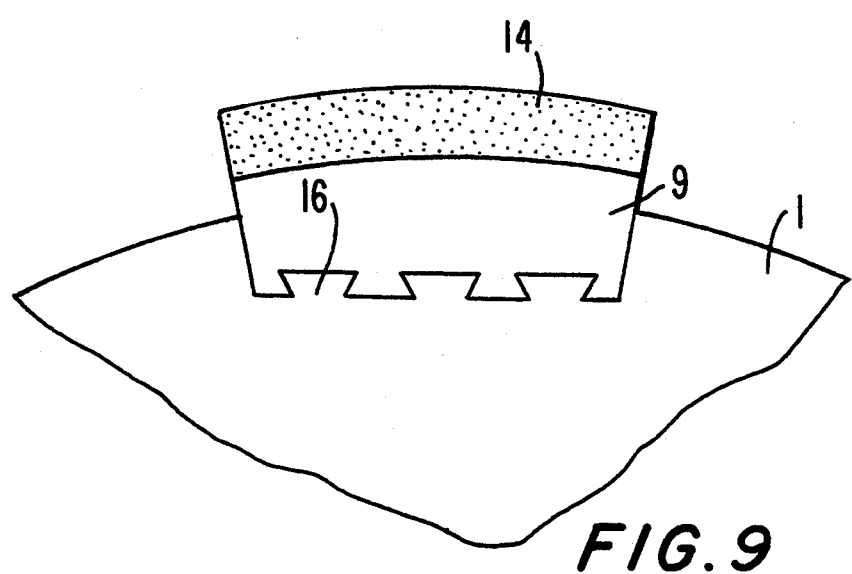

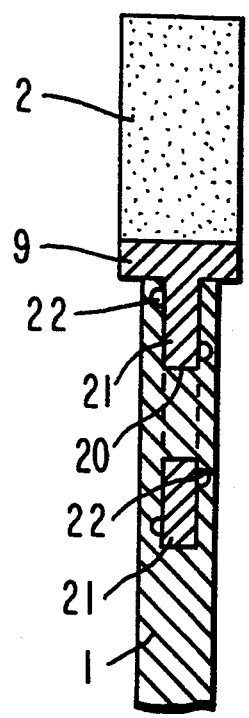
FIG.10
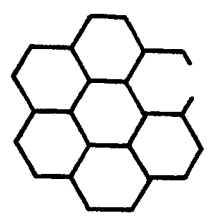
FIG.11
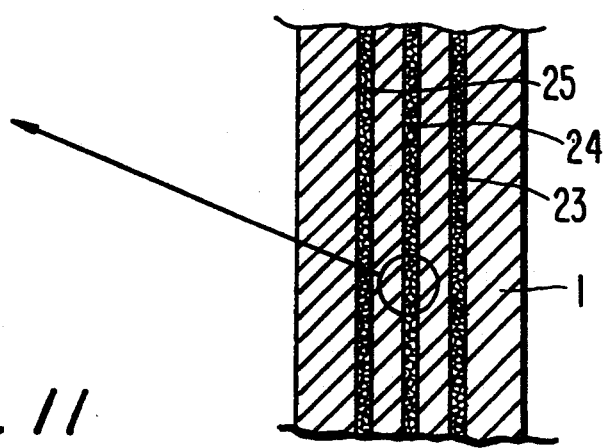

SAW

This is a continuation of application Ser. No. 400,467, filed Aug. 28, 1989.

BACKGROUND OF THE INVENTION

The present invention relates to a saw which has a saw blade provided on its outer edge with a single or multi-part hard metal or diamond-containing cutting coating.

Saws of this general type are widely known and used for separation of metal, stone or wood. There are circular saws with uninterrupted enclosed cutting coating or with a cutting coating which is subdivided into a plurality of segments. There are also cross-bar saws which are used for working of stone. There are also saws with inner holes for separating thin discs. These saws include normally a saw blade composed of steel.

The manufacture of saws with a saw blade of steel is connected for various reasons with considerable expenses. For forming a saw blade, the steel sheet must be first edged and milled. Then it must be ground and subjected to a thermal treatment as well as clamped and oriented. In addition, it can be adjusted to have a high tension, so that during use the saw does not deform since bending of the saw blade lead to variation of a cutting path.

When the saw blade has a sufficient thickness, there is a disadvantage that the steel possesses a relatively high specific weight of 7.5-8. This leads especially for large and fast rotatable saws to occurrence of high inertia forces which contributes to the deformation of the saw blades.

A further disadvantage of the known saw blades of steel resides in their high noise level which lead to resonance vibrations produced by the homogeneity of the steel material. Important are moreover the high considerable transportation costs connected with the high weight of saws especially when they have great diameters.

Finally, it has to be taken into consideration that the saws with a saw blade of steel and a cutting coating of diamond or cubic crystalline boron nitride which is generally comparable with diamonds has the high danger of rusting the reason is that they operate in a wet environment for cooling of the diamond coating, supply cooling water which is distributed on the saw blade. The rust can affect the firm hold of the high grade diamond cutting segments on the saw blade. This is especially true when the high grade diamond cutting bodies are connected with the saw blade by special carriers which are advantageous for some reasons. Taking the above into consideration attempts have been made to produce saws with the use of synthetic plastic materials.

The German document DE-OS 27 40 891 shows a saw which has a hub of a ring-shaped metal core and a metallic outer ring supporting the cutting bodies. On the hub and the outer ring, radially extending filaments or wires are mounted which connect these parts with one another. Connecting members are embedded in synthetic plastic material after manufacture of the construction. It is to be understood that the arrangement, orientation and clamping of the wires involves considerable expenses. The reason is that the centering of the outer metal ring relative to the inner ring must be ensured before the synthetic plastic is cast or pressed into the intermediate space.

Considerable expenses are required for the production of a known cutting off disc of synthetic plastic in which the grinding grains are directly embedded in a synthetic plastic material reinforced with carbon fibers. This saw is disclosed in the German document DE-OS 28 29 609. In this arrangement the saw blade does not form a carrier for the cutting segments or a cutting coating as in conventional saws. Such grinding discs are also not suitable for the use for grinding grains of diamonds which require a metallic binding, for example saws with greater diameters used for separation of steel or metal. In the known saws the cutting blades arranged on the periphery of the saw are replaced after their use with others as in the case of utilization of diamond grains held in cutting segments which are supported on the saw blade. Saws with high output due to their high diamond concentration cannot be produced in accordance with the known design from synthetic plastic material, since because of a sufficient binding the grinding grains do not make possible a high fiber fraction for reinforcing of the synthetic plastic. In addition, in such cutting off discs, together with the grinding grain also the grinding sheet or saw blade is consumed, in contrast to saws carrying continuous cutting coating or segments on their periphery which can be replaced after the use.

SUMMARY OF THE INVENTION

Accordingly, it is an object of the present invention to provide a saw with a diamond containing cutting coating in which a saw blade has a higher strength than a saw blade of steel and moreover provides for considerable advantages as compared with the latter.

In keeping with these objects and with others which will become apparent hereinafter, one feature of the present invention resides, briefly stated, in a saw which has a saw blade composed of synthetic plastic material with a fiber material of carbon or graphite fibers with a volume fraction of 30-70%.

When the saw is designed in accordance with the present invention, such a saw blade depending on the volume percentage fraction of the carbon or graphite fibers, possesses an elasticity molulus (E-modulus) which is higher or approximately equal to the E-modulus of steel and approximately the same high strength, and moreover a considerably lower weight as known saw blades so that the above-specified disadvantages are eliminated.

Due to the high E-modulus and the increased strength, a lower cutting width can be used. The considerably reduced weight leads during operation to relatively lower centrifugal forces. Thereby higher peripheral speeds and higher cutting speeds are possible. Since the material of the saw blade is not homogeneous, no noise generation which is unfavorable for the environment is produced. The lower weight leads to significantly reduced transportation costs which are especially pronounced for larger saws and further transportation advantages such as for example for expeditions or a use of the saws in space. Finally, it reduces the danger of accidents which could take place during handling of saw blades due to their high weight.

Carbon fibers as well as graphite fibers have an elasticity modulus which is higher than that of the steel. Due to the bond with the synthetic plastic, a body or a saw blade can be provided whose elasticity modulus lies in the region of that of steel. A volume percentage fraction of the carbon or graphite fibers in the saw blade is within the range of preferably 50–60% which is sufficient and advantageous from cost considerations. Further, the plastics of conventional type, such as epoxy resins or polyester resins can be used as binders for the fibers. Finally, there is a possibility to increase strength due to the additional utilization of glass fibers, whose use results in reduction of costs.

The saw blades of synthetic plastic material in accordance with the present invention can be cast or pressed or laminated by applying individual layers.

If the saw blade were composed of synthetic plastic material only, no sufficient directional stability could be expected. In other words, the saw blade can curve and thereby lead to a curved cutting. This is prevented with the utilization of graphite or carbon fibers which are arranged in form of fabric-like mats and impregnated with the synthetic plastic. The fiber mats can be cut or formed as circular segments which are arranged in rotation-symmetrical manner. They can overlap one another at their edge regions, which is derived from the fact that in the fiber mats the individual fibers extend substantially perpendicularly to one another. Such a fiber path over the whole saw blade would however lead to non-uniformities in the possible load take-up.

The fiber mats can be arranged in several layers over one another or near one another in a sandwich-like manner and posses different properties. For example, in the center the mats can be composed of softer fibers than in the outer regions. For the purpose of increased strength mats with a honeycomb structure can be utilized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partial view of a circular saw with a round uninterrupted cutting coating;

FIG. 2 is a partial view of a circular saw with a plurality of cutting segments;

FIG. 3 is a view showing a saw with an inner hole and inner cutting coating;

FIG. 4 is a partial view of a cross-bar saw with a plurality of cutting segments;

FIG. 5 is a partial view of a circular saw with segment-shaped fiber mat fragments in saw blade;

FIG. 6 is a view showing a section of a cutting segment with a carrier and a saw blade;

FIG. 7 is a view showing a section of the saw with a carrier in accordance with another embodiment of the present invention;

FIG. 8 is a view showing a section taken along the line 8—8 in FIG. 7;

FIG. 9 is a view showing a cutting segment of a saw in accordance with a further embodiment of a carrier;

FIG. 10 is a view showing a section of a saw with a T-shaped carrier; and

FIG. 11 is a view showing a section of a saw with a saw blade having several fiber mats.

DESCRIPTION OF THE PREFERRED EMBODIMENTS

The saw shown in FIG. 1 has a circular saw blade and identified with reference numeral 1 and a cutting coating 2 which is arranged on the outer periphery of the saw blade. The cutting coating 2 extends in an uninterrupted manner and is composed of diamond-containing material which is bonded metallically. In contrast to the embodiment of FIG. 1, in the fragment of FIG. 2 the cutting coating 2 is subdivided into individual cutting segments 3. The cutting segments 3 are mounted individually on the saw blade 1. The cutting segments contain diamond grains which are bonded metallically.

In deviation from the above described embodiments, the embodiment of FIG. 3 deals with a saw having an inner hole. The saw blade 1 here carries a cutting coating 2 on the edge of its inner hole 4. The cutting coating 2 extends circularly around the hole.

FIG. 4 shows a view of a cross-bar saw blade 1 provided with individual teeth 5. Each tooth has a diamond-containing main body and a holder which is explained later on.

In all above described embodiments the saws have a stem blade or a saw blade 1 which is composed from epoxy resin or polyester resin with carbon fibers or graphite fibers in a volume fraction of 50 to 70%. During the manufacture of the saw blade these fibers are utilized in form of fabric-like mats and are impregnated with a resin. As shown in FIG. 5, the mat portions 7 are formed as circular segments so as to insure that the main fiber directions are not uniformly distributed over the periphery of the saw blade. A further equilization in the fiber direction is achieved by the utilization of a number of fiber mats 6 which lie on one another instead of a single-layer thick fiber mat. A sandwich-like construction with its inherent, especially high strength can be used in this case. The individual fiber mats can have different properties so as to contribute to noise absorption.

It is advantageous in accordance with the present invention when the individual circular segment portions 7 overlap one another, and more particularly the neighboring circular segment portions 8 overlap each other in their edge regions 8.

The mounting of an uninterrupted cutting coating 2 and also individual cutting segments 3 on the saw blade 1 of synthetic plastic material, intermediate carriers can be used. For example, the intermediate carriers can be formed as U-shaped carriers 9. Such U-shaped carriers have a leg 10 as well as second leg 11 and a central web 12. Thereby relatively long adhesive surface is produced for mounting of a carrier 9 on the saw blade 11 by glueing, as can be seen in FIG. 6. The diamond containing cutting segment 14 is soldered by a soldering layer 15 on the outer side of the central web 12.

Instead of glueing, the carrier can also be connected with the saw blade 1 by screws or rivets. As shown in FIGS. 7 and 8, the shaped carrier 9 is provided with an opening 18. The opening coincides with a hole in a bush or sleeve 17 which is embedded in a saw blade during its manufacture.

Finally, as shown in FIG. 9, it is also possible to provide a carrier 9 with substantially dove-tail shaped recesses 16 of synthetic plastic resin during the manufacture of a saw blade 1. The resin fills the recesses 16 when the saw blade 1 is cast or pressed. The adhesive surface is significantly increased by the recesses. The carrier 19 can be disc-shaped.

In the embodiment of FIG. 10, a saw blade 1 composed of a fiber-reinforced synthetic plastic material is provided with cutting segments 14 having a carrier 9. The carrier has a T-shaped cross-section. One carrier 9 can carry also several cutting segments. It has a central web 21 which is thinner than the saw blade 1. Therefore the central web can be embedded into the saw blade 1 during its manufacture. In order to improve their holding, openings 20 are provided, through which the synthetic resin passes during casting or pressing of the saw blade.

For improved anchoring, ribs or other projections, such as notches or a grain 22 can be provided instead of the opening 20.

The carrier 9 with its central web 21 can be formed as a peripherally closed uninterrupted ring.

The carrier 9 of T-shaped cross-section has an upper transverse beam which carries one or several cutting segments 14 on its outer side. The transverse beam is wider than the thickness of the saw blade 1, so as to insure a free cutting.

Such a carrier can be composed of a metal. Basically there is however the possibility to use such carrier also of a synthetic resin and connect it with the synthetic resin of the saw blade 1 mechanically or by chemical reaction.

FIG. 11 schematically shows a section of a saw blade 1 which is composed of synthetic plastic material having several fabric mats 23, 24, 25. The mats are arranged in a sandwich-like manner. The central mat 24 has a honeycomb structure for increasing the strength with low weight.

It will be understood that each of the elements described above, or two or more together, may also find a useful application in other types of constructions differing from the types described above.

While the invention has been illustrated and described as embodied in a saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A saw, comprising a saw blade having an edge; and a cutting coating arranged on said edge of said saw blade and selected from the group consisting of a diamond-containing coating and a cubic crystalline boron nitride-containing coating, said cutting coating being subdivided into a plurality of individual cutting segments, said saw blade being composed of a synthetic plastic reinforced with a fiber material composed of a plurality of fibers selected from the group consisting of carbon fibers and graphite fibers with a volume fraction of 30–70%, said cutting segments being provided with carriers which are partially imbedded in the synthetic plastic of said saw blade, said fiber material being formed as a plurality of fabric-like mats which are arranged in said saw blade in at least one layer, said mats being formed as circular segments which are arranged in a rotation-symmetrical manner relative to an axis of said saw blade and have edge regions which overlap each other.

2. A saw, comprising a saw blade having an edge; and a cutting coating arranged on said edge of said saw blade and selected from the group consisting of a diamond-containing coating and a cubic crystalline boron nitride-containing coating, said cutting coating being subdivided into a plurality of individual cutting segment, said saw blade being composed of a synthetic plastic reinforced with a fiber material composed of a plurality of fibers selected from the group consisting of carbon fibers and graphite fibers with a volume fraction of 30–70%, said cutting segments being provided with carriers which are partially imbedded in the synthetic plastic of said saw blade, said carriers being provided with substantially dove-tailed shaped recesses.

3. A saw, comprising a saw blade having an edge; and a cutting coating arranged on said edge of said saw blade and selected from the group consisting of a diamond-containing coating and a cubic crystalline boron nitride-containing coating, said cutting coating being subdivided into a plurality of individual cutting segment, said saw blade being composed of a synthetic plastic reinforced with a fiber material composed of a plurality of fibers selected from the group consisting of carbon fibers and graphite fibers with a volume fraction of 30–70%, said cutting segments being provided with carriers which are partially imbedded in the synthetic plastic of said saw blade; and a plurality of bushes imbedded in said saw blade and provided for said carriers, said carriers of said cutting segments being U-shaped and having legs which are screwed to said saw blade.

4. A saw, comprising a saw blade having an edge; and a cutting coating arranged on said edge of said saw blade and selected from the group consisting of a diamond-containing coating and a cubic crystalline boron nitride-containing coating, said cutting coating being subdivided into a plurality of individual cutting segment, said saw blade being composed of a synthetic plastic reinforced with a fiber material composed of a plurality of fibers selected from the group consisting of carbon fibers and graphite fibers with a volume fraction of 30–70%, said cutting segments being provided with carriers which are partially imbedded in the synthetic plastic of said saw blade; and a plurality of bushes imbedded in said saw blade and provided for said carriers, said carriers of said cutting segments being U-shaped and having legs which are riveted to said saw blade.

5. A saw, comprising a saw blade having an edge; and a cutting coating arranged on said edge of said saw blade and selected from the group consisting of a diamond-containing coating and a cubic crystalline boron nitride-containing coating, said cutting coating being subdivided into a plurality of individual cutting segment, said saw blade being composed of a synthetic plastic reinforced with a fiber material composed of a plurality of fibers selected from the group consisting of carbon fibers and graphite fibers with a volume fraction of 30–70%, said cutting segments being provided with carriers which are partially imbedded in the synthetic plastic of said saw blade, each of said carriers having a T-shaped cross-section and is provided with a central web which is imbedded in the synthetic plastic of said saw blade.

6. A saw as defined in claim 5, wherein said carriers have a transverse beam which is wider than the thickness of said saw blade.

7. A saw as defined in claim 5, wherein said central webs of said T-shaped carriers are provided with openings.

8. A saw as defined in claim 5, wherein said central webs of said T-shaped carriers are provided with ribs.

9. A saw as defined in claim 5, wherein said central webs of said T-shaped carriers are provided with grains.

10. A saw as defined in claim 5, wherein said central web of said carriers is ring-shaped.

11. A saw as defined in claim 2, wherein said carriers together form a single one-piece ring-shaped carrier which carries all said cutting segments of said cutting coating and is partially imbedded in the synthetic plastic of said saw blade.

* * * * *